(12) United States Patent
Mallikarjuna Durga Lokanath et al.

(10) Patent No.: US 12,301,657 B2
(45) Date of Patent: *May 13, 2025

(54) SHARING OBJECTS ACROSS NAMESPACES IN A CONTAINER-ORCHESTRATION SYSTEM

(71) Applicant: Salesforce, Inc., San Francisco, CA (US)

(72) Inventors: Savithru Mallikarjuna Durga Lokanath, San Jose, CA (US); Arpeet Kale, San Jose, CA (US)

(73) Assignee: Salesforce, Inc., San Francisco, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 18/497,734

(22) Filed: Oct. 30, 2023

(65) Prior Publication Data
US 2024/0064201 A1 Feb. 22, 2024

Related U.S. Application Data

(63) Continuation of application No. 17/817,606, filed on Aug. 4, 2022, now Pat. No. 11,843,662, which is a
(Continued)

(51) Int. Cl.
*H04L 67/1095* (2022.01)
*G06F 9/455* (2018.01)
*G06F 9/50* (2006.01)

(52) U.S. Cl.
CPC ...... *H04L 67/1095* (2013.01); *G06F 9/45558* (2013.01); *G06F 9/5077* (2013.01); *G06F 2009/4557* (2013.01)

(58) Field of Classification Search
CPC ............ H04L 67/1095; G06F 9/45558; G06F 9/5077; G06F 2009/4557
See application file for complete search history.

(56) References Cited

U.S. PATENT DOCUMENTS 7,730,478 B2 6/2010 Weissman
8,782,748 B2 * 7/2014 Olszewski ............ H04L 63/104
726/4
(Continued)

OTHER PUBLICATIONS

Kappes et al., "Multitenant Access Control for Cloud Aware Distributed Filesystems", IEEE Transactions on Dependable and Secure Computing, vol. 16, Issue 6, Nov. 1, 2019.*
(Continued)

*Primary Examiner* — Todd L Barker
(74) *Attorney, Agent, or Firm* — Nicholson De Vos Webster & Elliott LLP

(57) ABSTRACT

A method for replicating a set of parent resources from an administrator namespace to a set of tenant namespaces is described. The method includes receiving, by the administrator namespace, a global object that includes a set of object fields that reference (1) a set of parent resources and (2) the set of tenant namespaces; monitoring, by an operator controller of the administrator namespace, the global object to determine whether a change has been made to the global object; and replicating, by the operator controller, the set of parent resources to the set of tenant namespaces as child resources based on the global object in response to detecting a change to the global object.

18 Claims, 10 Drawing Sheets

Related U.S. Application Data continuation of application No. 17/131,296, filed on Dec. 22, 2020, now Pat. No. 11,445,021.

(56) References Cited

U.S. PATENT DOCUMENTS

| | | | |
|---|---|---|---|
| 10,097,589 B2 | 10/2018 | Hopkins et al. | |
| 10,339,123 B2 | 7/2019 | Venkatesh et al. | |
| 11,100,129 B1 | 8/2021 | Popick et al. | |
| 11,140,166 B2 * | 10/2021 | Berg | H04L 63/101 |
| 11,275,733 B1 | 3/2022 | Batsakis et al. | |
| 2016/0004760 A1 | 1/2016 | Rogers et al. | |
| 2020/0125582 A1 | 4/2020 | O'Shaughnessy | |
| 2021/0241241 A1 | 8/2021 | Lokanath | |

OTHER PUBLICATIONS

Kappes et al., "Multitenant Access Control for Cloud-Aware Distributed Filesystems", IEEE Transactions on Dependendable and Secure Computing, vol. 16, Issue 6, Nov.-Dec. 2019, IEEE Publishing.

Notice of Allowance, U.S. Appl. No. 17/817,606, Sep. 5, 2023, 9 pages.

Notice of Allowance, U.S. Appl. No. 17/131,296, May 4, 2022, 9 pages.

The Linux Foundation, "Control Plane," Standardized Glossary, Kubernetes Documentation, Feb. 22, 2019, downloaded from https://web.archive.org/web/20201113143251/https://kubernetes.io/docs/reference/glossary/?all=true, p. 2.

The Linux Foundation, "Controllers," Kubernetes Documentation, Oct. 12, 2020, 3 pages.

The Linux Foundation, "Custom Resources," Kubernetes Documentation, Oct. 13, 2020, downloaded from https://web.archive.org/web/20201208203013/https://kubernetes.io/docs/concepts/extend-kubernetes/api-extension/custom-resources/, 7 pages.

The Linux Foundation, "Operator pattern," Kubernetes Documentation, Oct. 22, 2020, downloaded from https://web.archive.org/web/20201221021833/https://kubernetes.io/docs/concepts/extend-kubernetes/operator/, 3 pages.

The Linux Foundation, "Overview of kubectl," Kubernetes Documentation, Nov. 20, 2020, downloaded from https://web.archive.org/web/20201211173616/https://kubernetes.io/docs/reference/kubectl/overview/, 13 pages.

Vasilyev, S. "Kopf: Kubernetes Operators Framework," Copyright 2020 Sergey Vasilyev; 2019-2020 Zalando SE. Revision ab53ace8, downloaded from https://kopf.readthedocs.io/en/latest/, 7 pages.

* cited by examiner

CLUSTER-ROLE MANIFEST
200

```
RULES:
- APIGROUPS: [""]
  RESOURCES: ["SECRETS", "CONFIGMAPS"]
  VERBS: ["GET", "CREATE", "UPDATE", "LIST"]
- APIGROUPS: [""]
  RESOURCES: ["NAMESPACES"]
  VERBS: ["GET", "LIST"]
- APIGROUPS: [""]
  RESOURCES: ["GLOBALOBJECTS"]
  VERBS: ["GET", "WATCH"]
- APIGROUPS: [""]
  RESOURCES: ["EVENTS"]
  VERBS: ["CREATE"]
```

FIG. 2

```
APIVERSION: APIEXTENSIONS.K8S.IO/V1BETA1
KIND: CUSTOMRESOURCEDEFINITION
METADATA:
  NAME: GLOBALOBJECTS.EINSTEIN.AI
  LABELS:
    APP: AGUMBE
SPEC:
  SCOPE: NAMESPACED
  GROUP: INFRA.EINSTEIN.AI
  VERSION: V1BETA
  NAMES:
    KIND: GLOBALOBJECT
    SINGULAR: GLOBALOBJECT
    PLURAL: GLOBALOBJECTS
    SHORTNAMES:
      - GO
  VALIDATION:
    OPENAPIV3SCHEMA:
      PROPERTIES:
        SPEC:
          PROPERTIES:
            TYPE:
              TYPE: STRING                                                                  304A
              DESCRIPTION: "TYPE OF THE OBJECT TO REPLICATE INTO NAMESPACE(S)"
              ENUM: ["SECRET", "CONFIGMAP"]
            NAME:
              TYPE: STRING                                                                  304B
              DESCRIPTION: "NAME OF THE OBJECT TO REPLICATE INTO NAMESPACE(S)"
            TARGETNAME:
              TYPE: STRING                                                                  304C
              DESCRIPTION: "NAME OF THE OBJECT IN THE TARGET NAMESPACE(S)"
            TARGETNAMESPACES:
              TYPE: ARRAY                                                                   304D
              DESCRIPTION: "NAMESPACE(S) TO WHICH THE OBJECT HAS TO BE REPLICATED"
            MATCHLABELS:
              TYPE: ARRAY                                                                   304E
              DESCRIPTION: "NAMESPACE(S) LABELS TO MATCH"
          REQUIRED: ["TYPE", "NAME"]                                                        306
```

302

CUSTOM RESOURCE DEFINITION
114

FIG. 3

```
              GLOBAL OBJECT
                   112
      ⎧METADATA:
  402 ⎨    NAME: GLOBAL-SECRET
      ⎩    NAMESPACE: ADMIN
      ⎧SPEC:
      ⎪ 406A {TYPE: SECRET
      ⎪ 406B {NAME: SECRET-SEP-01-2020
      ⎪      ⎧MATCHLABELS:
      ⎪ 406C ⎨    - KEY: NAMESPACE
  404 ⎨      ⎩      VALUE: MONITORING
      ⎪ 406D {TARGETNAME: MY-SECRET
      ⎪      ⎧TARGETNAMESPACES:
      ⎪      ⎪    - PROXY
      ⎪ 406E ⎨    - APP
      ⎩      ⎩    - DATABASE
```

FIG. 4

```
APIVERSION: V1
KIND: SECRET
METADATA:
802 { 804A  NAME: SECRET-SEP-01-2020
      804B  NAMESPACE: ADMIN
TYPE: OPAQUE
DATA:
    HELLO: D29YBGQ=
```

PARENT RESOURCE 104

FIG. 8

SHARING OBJECTS ACROSS NAMESPACES IN A CONTAINER-ORCHESTRATION SYSTEM

CROSS-REFERENCE TO RELATED APPLICATIONS

This application is a continuation of application Ser. No. 17/817,606 filed Aug. 4, 2022, which is a continuation of application Ser. No. 17/131,296 filed Dec. 22, 2020 (now U.S. Pat. No. 11,445,021), which are hereby incorporated by reference.

TECHNICAL FIELD

One or more implementations relate to the field of container-orchestration systems; and more specifically, to sharing objects across namespaces in a container-orchestration system.

BACKGROUND ART

"Cloud" services provide shared resources, software, and information to computers and other electronic devices upon request. In cloud computing environments, software can be accessible over the internet rather than installed locally on in-house computer systems. Cloud services typically involve over-the-internet provision of dynamically scalable and often virtualized resources. Technological details can be abstracted from the users, who no longer have need for expertise in, or control over, the technology infrastructure "in the cloud" that supports them.

The term "micro-services architecture" refers to an architecture in which each of the micro-services does just one thing efficiently and interacts with others of the micro-services as needed. This contrasts with monolithic architectures in which complex software is run on a single, powerful server. Each of the micro-services may use a different type of hardware and/or software to respectively perform a specialized type of processing different from the types of processing performed by the other micro-services. Moreover, the micro-services architecture allows an application to be decomposed into different ones of these smaller micro-services, improving modularity and making the program code easier to understand, design and test. For example, individual micro-services may be modified (e.g., upgraded, swapped out) without affecting the operation of other micro-services used by the application.

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes® is a COS that works with a range of container tools, including Docker®. Another example of a COS is Docker Swarm®. A container is a self-contained execution environment, such as a Linux® execution environment; in other words, a container is a standard unit of software that packages up code and all its dependencies, so the application runs quickly and reliably from one computing environment to another. A container image is used to create one or more containers at runtime. A container image is a lightweight, standalone, executable package of software that includes everything needed to run an application: code, runtime, system tools, system libraries and settings (e.g., a Docker® container image becomes a Docker® container when it is run on Docker® Engine; another container engine is Rkt).

BRIEF DESCRIPTION OF THE DRAWINGS

The following figures use like reference numbers to refer to like elements. Although the following figures depict various exemplary implementations, alternative implementations are within the spirit and scope of the appended claims. In the drawings:

FIG. 2 shows a cluster-role manifest for defining privileges of an operator controller of an administrator namespace in the cluster, according to one example implementation.

FIG. 3 shows a custom resource definition for defining a schema of global objects, according to one example implementation.

FIG. 4 shows a global object that was generated based on the custom resource definition, according to one example implementation.

FIG. 8 shows a parent resource, according to one example implementation.

DETAILED DESCRIPTION

The following description describes methods and apparatus for sharing objects across namespaces in a container-orchestration system (e.g., in a Kubernetes®-based system).

Figure 1:
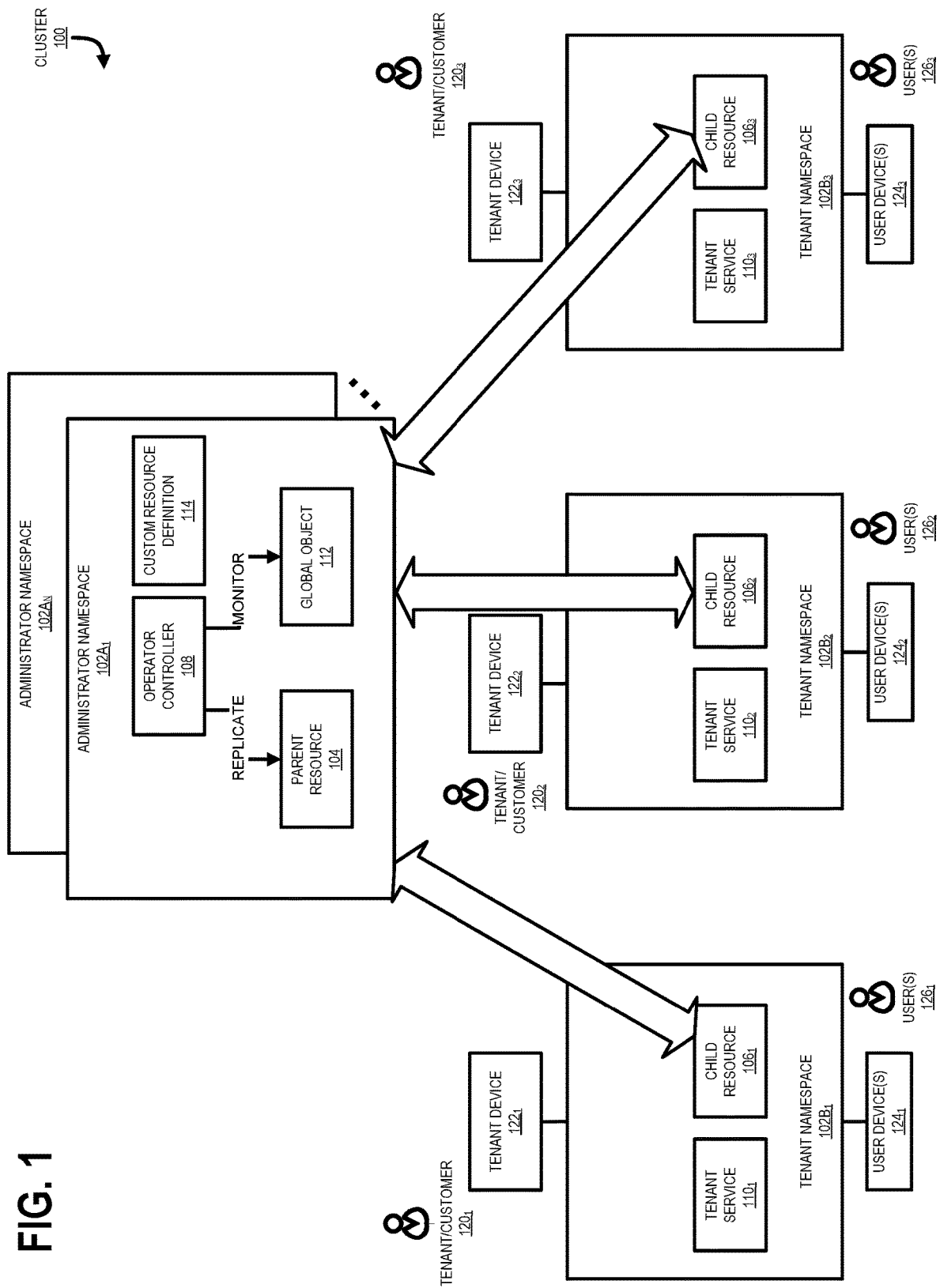
FIG. 1 is a block diagram illustrating a cluster operating in a container-orchestration system, according to some example implementations.

FIG. 1 shows a cluster 100 operating in a container-orchestration system, according to one example implementation. As shown, the cluster 100 includes a set of namespaces 102. In particular, the cluster 100 includes a set of administrator namespaces $102A_1$-$102A_N$ and three tenant namespaces $102B_1$-$102B_3$. In some implementations, the cluster 100 may include multiple administrator namespaces 102A, which manage parent resources 104 (sometimes referred to as parent objects 104) in the administrator namespaces 102A and child resources 106 (sometimes referred to as child objects 106, replicated resources 106, or replicated objects 106) in the tenant namespaces 102B. In these implementations, a leader namespace 102A may be elected amongst the multiple administrator namespaces 102A to avoid running into a race condition (e.g., to avoid multiple administrator namespaces 102A attempting to access/write the same piece of data). For example, priorities may be assigned to each administrator namespace 102A in the cluster 100 during initialization of the namespaces 102A and the priorities may be used for determining a leader amongst the administrator namespaces 102A (e.g., a lowest priority administrator namespace 102A is elected the leader amongst the administrator namespaces 102A in the cluster 100).

Further, although shown as including three tenant namespaces $102B_1$-$102B_3$, in other implementations, the cluster 100 may include a different number of tenant namespaces 102B. For example, in some implementations, the cluster 100 may include hundreds or thousands of tenant namespaces 102B. For purposes of illustration, the cluster 100 will be further described in relation to one administrator namespace 102A (e.g., the administrator namespace $102A_1$) and three tenant namespaces $102B_1$-$102B_3$. However, it is understood that different numbers of administrator namespaces 102A and tenant namespaces 102B are possible in a cluster 100, and these clusters 100 would operate in a similar fashion as the example implementations described herein.

Each namespace 102 may include or may be represented by one or more nodes, where a node is a representation of a single machine in the cluster 100, where that single machine can be a physical machine in a datacenter or virtual machine hosted on a cloud provider. With regard to software, a namespace 102 may include or may be represented by 1) containers; 2) pods (e.g., "kpods" in a Kubernetes® implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, or Kube-proxy (a combination of a network proxy and a load balancer).

Each of the tenant namespaces 102B are associated with a separate tenant/customer 120 and may be used for operating tenant services 110 for the tenant/customer 120 or users/customers of the tenants 120. For example, the tenant service $110_1$ may be a proxy application for a first tenant $120_1$ of the cluster 100, the tenant service $110_2$ may be a routing application for a second tenant $120_2$ of the cluster 100, and the tenant service $110_3$ may be a database application for a third tenant $120_3$ of the cluster 100. Each of the tenants $120_1$-$120_3$ may access their corresponding tenant namespaces $102B_1$-$102B_3$, including corresponding tenant services $110_1$-$110_3$ and child resources $106_1$-$106_3$, via tenant devices $122_1$-$122_3$, which may be an electronic device with a corresponding user interface for configuring the tenant namespaces 102B. Each of the tenant services $110_1$-$110_3$ may utilize a corresponding child resource $106_1$-$106_3$ that is accessible in the associated tenant namespace $102B_1$-$102B_3$ for performing operations of the tenant services $110_1$-$110_3$. For example, the child resources 106 may each be (1) a secret, which are used by the tenant services 110 for accessing a shared service (e.g., the secret is a password or other authentication credentials used to access a shared database or shared service) or (2) a configuration map that configures operation of the tenant services 110 (e.g., provides values of particular variables used by the tenant services 110). However, each of the tenant services $110_1$-$110_3$ cannot access (e.g., read or write) objects/data from other tenant namespaces $102B_1$-$102B_3$ (e.g., cannot access child resources 106 outside their own tenant namespace 102B) or objects/data from an administrator namespaces 102A (e.g., cannot access parent resources 104 from an administrator namespace 102A).

In some implementations, the administrator namespace 102A may be considered a parent namespace and the tenant namespaces 102B may be considered children namespaces to the administrator namespace 102A. In this configuration, the tenant namespaces 102B may include proprietary information/data of the tenants/customers 120 that is used by the tenants 120 to perform one or more operations or tasks for a set of users 126 of the tenant 120 of a corresponding tenant namespaces 102B. The term "user" is a generic term referring to an entity (e.g., an individual person) using a system and/or service. A multi-tenant architecture provides each tenant 120 with a dedicated share of a software instance and the ability (typically) to input tenant specific data for user management, tenant-specific functionality, configuration, customizations, non-functional properties, associated applications, etc. Multi-tenancy contrasts with multi-instance architectures, where separate software instances operate on behalf of different tenants. A tenant 120 includes or is associated with a group of users 126 who share a common access with specific privileges to a software instance providing a service (e.g., the tenant services 110). A tenant 120 may be an organization (e.g., a company, department within a company, etc.). A tenant 120 may have one or more roles relative to a system and/or service. For example, in the context of a customer relationship management (CRM) system or service, a tenant 120 may be a vendor using the CRM system or service to manage information the tenant 120 has regarding one or more customers of the vendor. As another example, in the context of Data as a Service (DAAS), one set of tenants 120 may be vendors providing data and another set of tenants 120 may be customers of different ones or all of the vendors' data. As another example, in the context of Platform as a Service (PAAS), one set of tenants 120 may be third party application developers providing applications/services and another set of tenants 120 may be customers of different ones or all of the third-party application developers. A user 126 may have one or more roles relative to a system and/or service. To provide some examples, a user 126 may be a representative (sometimes referred to as an "end user") of a tenant 120 (e.g., a vendor or customer), a representative (e.g., an administrator) of the company providing the system and/or service, and/or a representative (e.g., a programmer) of a third-party application developer that is creating and maintaining an application(s) on a Platform as a Service (PAAS). The users $126_1$-$126_3$ of each tenant 120 may access the services and resources of a corresponding tenant namespace 102B via a corresponding user device $124_1$-$124_3$, which is an electronic device.

As noted above, each administrator namespace 102A includes a parent resource 104 (or a set of parent resources 104) and each tenant namespace 102B includes a child resource 106 (or a set of child resources 106). Each of these resources 104/106 may be considered namespaced objects, as they cannot be accessed outside of their tenant namespace 102 except by a higher-level namespace 102 (e.g., administrator namespaces 102A can access objects/resources 106 in corresponding tenant namespaces 102B), but tenant namespaces 102B cannot access (1) objects/resources 106 from other tenant namespaces 102B (as these objects/resources 106 are at the same hierarchical level and exist in another namespace 102) or (2) objects/resources 104 from an administrator namespace 102A (as these objects/resources 104 are at a higher hierarchical level). In particular, namespaced objects, in some container-orchestration systems (e.g., Kubernetes®), cannot be configured to be shared across logical boundaries (e.g., across namespaces operating at the same or higher hierarchical level). For example, each child resource 106 can only be accessed (e.g., read or written) (1) by the tenant namespace 102B to which it belongs or (2) by a higher-level administrator namespace 102A. For example, as noted above, the child resource $106_1$ can be accessed by tenant service $110_1$, which is within tenant namespace $102B_1$, and by the administrator namespace $102A_1$, but the parent resource 104 cannot be accessed by the administrator namespace $102A_1$.

In some systems, to share a certain object across multiple namespaces, the object needs to be scoped at the cluster level. Unfortunately, in many container-orchestration systems, including Kubernetes®-based systems, there is limited or no support for scoping objects at the cluster layer. The inability to scope objects at a higher level, such that these objects can be accessed by lower level namespaces, has created a gap for certain use cases. For example, when multiple namespaces, which may be mapped to separate services, tenants, etc., need access to a common object (e.g., a secret used for authentication or a configuration map used for configuring a service), there is not a way to make these objects available to the namespaces other than having to manually create them in each namespace. This repetitive process is time consuming, error prone, and monotonous. For example, a system may utilize a private container registry to store images and application artifacts. In a Kubernetes® system, when an application pod is deployed to a namespace, a Kubelet may use confidential information stored in a Kubernetes® secret object to authenticate against the private registry and pull a private image on behalf of the application pod. In this configuration, an administrator of the system not only needs to inject these secrets during namespace provisioning (e.g., provisioning of tenant namespaces) but must also be compliant and rotate the secrets at regular intervals. When there are hundreds or thousands of namespaces to manage, the process becomes complicated and cumbersome. In addition to rotating secrets and/or certificates, systems configured in this fashion may introduce other elements of overhead during operation, including (1) updating configuration maps (ConfigMaps), pod distribution budgets (PodDisruptionBudgets), quotas, network policies (NetworkPolicy), and/or role-based access control (RBAC) resources and/or (2) detecting configuration drifts, manual changes, etc.

To address the above issues, an operator/controller pattern may be used in some implementations. In particular, as will be described in greater detail below, an operator controller 108 may be used to replicate objects/resources from the administrator namespace $102A_1$ to one or more of the tenant namespaces 102B. In some implementations, the operator controller 108 is a control loop that makes use of the current state of the cluster 100 to make intelligent decisions regarding replication of the object.

In one implementation, the operator controller 108 needs access permission to monitor changes and make changes to namespaced objects (e.g., the child resources 106). In particular, in some implementations, the operator controller 108 needs permission to monitor updates to namespaced objects and create, read, update, and/or delete namespaced objects across namespaces 102. In some implementations, a cluster-role manifest may be used to define these permissions. For example, FIG. 2 shows a cluster-role manifest 200 for defining privileges of the operator controller 108, according to one example implementation. As shown, the cluster-role manifest 200 indicates that the operator controller 108 can perform (1) GET, CREATE, UPDATE, and LIST operations on SECRETS and CONFIGMAPS (e.g., the child resources 106), (2) GET and LIST operations on NAMESPACES (e.g., the tenant namespaces 102B), (3) GET and WATCH operations on GLOBALOBJECTS (e.g., the global object 112), and (4) CREATE operations for EVENTS in the cluster 100.

In one implementation, a global object 112 may be used for configuring the operator controller 108 relative to a set of parent resources 104 and a set of child resources 106. In particular, the global object 112 may (1) identify an object to replicate (e.g., a parent resource 104), (2) a set of tenant namespaces 102B to replicate the identified object to (e.g., one or more of the tenant namespaces $102B_1$-$102B_3$), and (3) a name of a replica of the object in the tenant namespaces 102B (e.g., a name of the child resources 106 in the tenant namespaces $102B_1$-$102B_3$). Although described in relation to a single global object 112, the operator controller 108 may be configured to operate in conjunction with multiple global objects 112 that are associated with corresponding parent resources 104.

In some implementations, the operator controller 108 may utilize a custom resource definition 114 for defining a schema of global objects 112. For example, FIG. 3 shows a custom resource definition 114, according to one example implementation. As shown in FIG. 3, the custom resource definition 114 includes a validation section 302 that indicates a set of fields 304A-304E that may be included in a global object 112, including (1) the names for each of these fields 304A-304E; (2) the data types for each of these fields 304A-304E; (3) a textual description for each of these fields 304A-304E; and (4) possible values for one or more of these fields 304A-304E. For example, a global object 112 created based on the custom resource definition 114 shown in FIG. 3 may include (1) a type field 304A that indicates a type of the object from an administrator namespace 102A to replicate in a set of tenant namespaces 102B (e.g., either a SECRET or CONFIGMAP object); (2) a name field 304B that indicates a name of the object (e.g., a name of a parent resource 104) to replicate in the set of tenant namespaces 102B; (3) a target name field 304C that indicates the name of the replicated object in the set of tenant namespaces 102B (i.e., the name of the file/object once it is stored as a child resource 106 in the set of tenant namespaces 102B); (4) a target namespaces field 304D that explicitly lists/indicates the set of tenant namespaces 102B that the object will be replicated to (i.e., the target namespaces field 304D provides unique identifiers for each tenant namespace 102B in the set of tenant namespaces 102B that the parent object 104 will be replicated to); and (5) a match labels field 304E that indicates labels associated with the set of tenant namespaces 102B that the object will be replicated to (i.e., the match labels field 304E indicates one or more labels that can each be associated with one or more tenant namespaces 102B and each tenant namespace 102B that is associated with these labels is part of the set of tenant namespaces 102B that the parent object 104 will be replicated to). Based on the above, any global object 112 monitored by the operator controller 108 may not include any additional fields that are not listed in the validation section 302 of the custom resource definition 114.

In some implementations, the custom resource definition 114 may indicate a set of required fields 304 that are required to be present in a global object 112 such that the global object 112 can be processed/utilized by the operator controller 108. For example, the required field 306 in the example shown in FIG. 3 indicates that the type field 304A and the name field 304B are required to be present in any global object 112 that is created based on this example custom resource definition 114. Accordingly, the fields 304C, 304D, and 304E are optional in any global object 112 that is created based on this example custom resource definition 114 shown in FIG. 3.

FIG. 4 shows an example global object 112 according to one example implementation. The global object 112 of FIG. 4 was generated based on the custom resource definition 114 shown in FIG. 3. As shown, the global object 112 includes a metadata section 402 and a specification section 404. The metadata section 402 indicates data describing the global object 112. For example, as shown in FIG. 4, the metadata section 402 includes a name field, which identifies a name of the global object 112 (e.g., "GLOBAL-SECRET"), and a namespace field, which identifies the namespace 102 in which the global object 112 logically resides (e.g., the global object 112 in the example of FIG. 4 resides in the "ADMIN" namespace (e.g., the namespace 102A$_1$)).

The specification section 404 includes a set of fields 406, which describe the replication of a parent object 104 by the operator controller 108 from an administrator namespace 102A to a set of tenant namespaces 102B. In some implementations, the specification section 404, including the set of fields 406, comply with a custom resource definition 114 utilized by the operator controller 108, the administrator namespace 102A, and/or the cluster 100. For example, the set of fields 406 of the global object 112 shown in FIG. 4 must be drawn from the set of fields 304 from the custom resource definition 114 shown in FIG. 3. Further, when the custom resource definition 114 indicates a set of required fields 306, a global object 112 created based on this custom resource definition 114 must include fields 406 that correspond to this set of required fields 306. When the set of fields 406 of the global object 112 are not from the set of fields 304 from the custom resource definition 114 (e.g., the fields 406 of the global object 112 include one or more fields 406 not defined in the custom resource definition 114) or the set of fields 406 of the global object 112 does not include a required field 306, the operator controller 108 indicates that there is an error in the global object 112 and does not replicate the parent resource 104 according to the indications in the global object 112.

As noted above, an operator controller 108 in an administrator namespace 102A replicates the parent resource 104 from the administrator namespace 102A to a set of tenant namespaces 102B that are indicated in a corresponding global object 112. These replicated parent resources 104 may be represented as child resources 106 in the set of tenant namespaces 102B using the object name specified by the global object 112.

In some implementations, an operator controller 108 in an administrator namespace 102A monitors each global object 112 in the administrator namespace 102A and intelligently replicates corresponding parent resources 104 to tenant namespaces 102B. For example, upon detecting initial creation of a global object 112, the operator controller 108 may determine if the global object 112 complies with a corresponding custom resource definition 114. If the operator controller 108 determines that the global object complies with the custom resource definition 114, the operator controller 108 replicates one or more parent resources 104 indicated in the global object 112 to a set of tenant namespaces 102B, which is also indicated in the global object 112. Thereafter, the operator controller 108 may monitor the global object 112 to determine if any changes have been made to the global object 112. Upon detecting a change to the global object 112 (e.g., a change to the name field 406B, such that the global object 112 refers to a different parent resource 104 to replicate, or a change to one or more of match labels field 406C and the target namespaces field 406E, such that the set of tenant namespaces 102B that the parent resource 104 is to be replicated to changes), the operator controller 108 may replicate one or more parent resources 104 indicated in the global object 112 to a set of tenant namespaces 102B indicated in the updated or new global object 112. In some embodiments, the global operator 108 may also monitor the child resources 106 in each tenant namespace 102B to determine if changes have been made relative to a corresponding parent resource 104. Namely, in response to determining that a change has been made to a child resource 106 (e.g., a user 126, user device 124, and/or a service in the tenant namespace 102B has modified a character in the child resource 106, metadata associated with the child resource 106, and/or a name of the child resource 106 in comparison to the parent resource 104 and/or the global object 112), the global object 112 may again replicate the parent resource 104 into the corresponding tenant namespace 102B. This may result in the previous child resource 106 being deleted or overwritten. Further details of this technique will be described in greater detail below.

Figure 5:
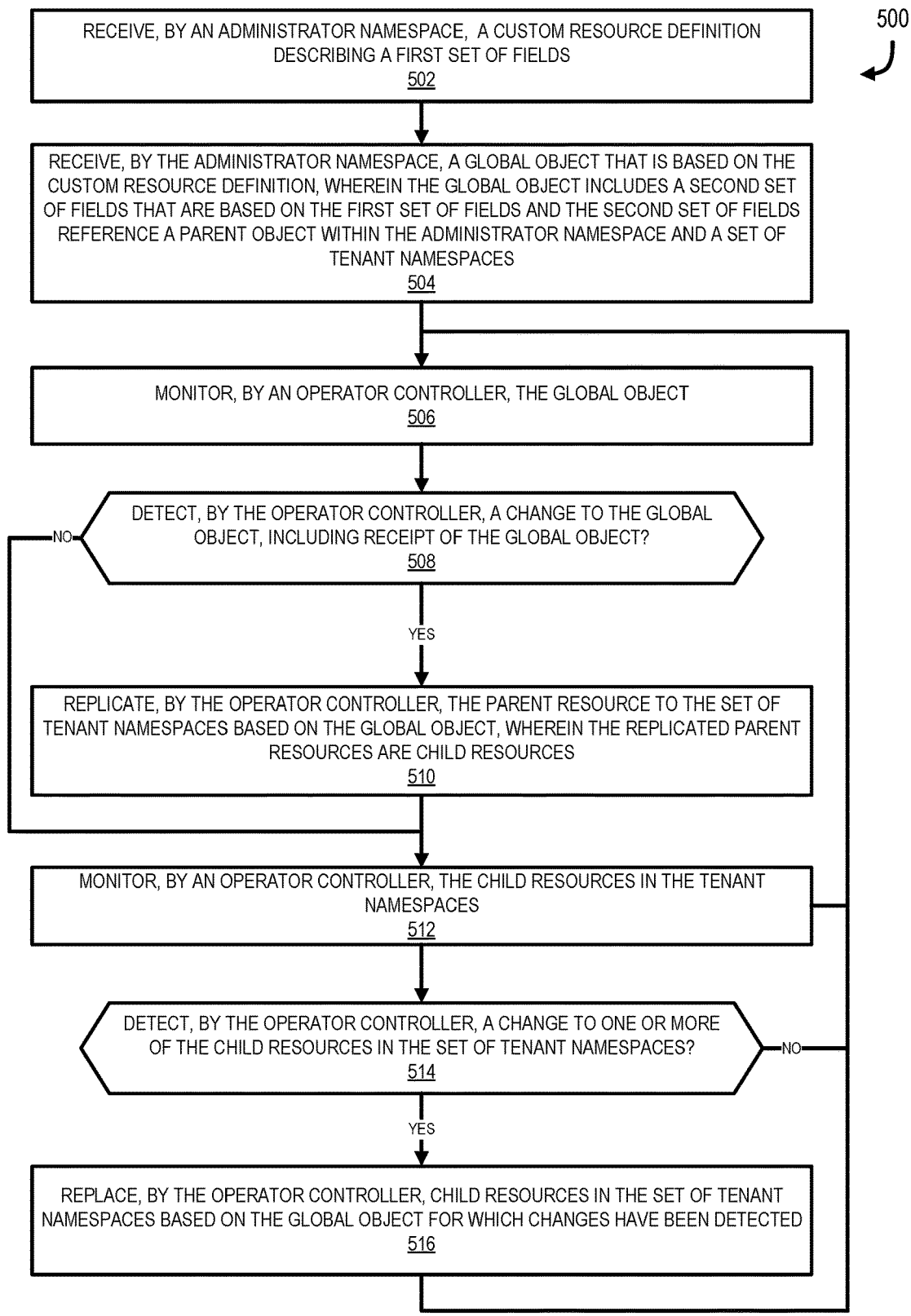
FIG. 5 shows a method for replicating a set of parent resources from an administrator namespace to one or more tenant namespaces, according to one example implementation.

FIG. 5 shows a method 500 for replicating a set of parent resources 104 from an administrator namespace 102A to one or more tenant namespaces 102B, according to one example implementation. One or more operations of the method 500 can be performed by elements of the cluster 100, including elements of an administrator namespace 102A (e.g., an operator controller 108 of an administrator namespace 102A) and/or elements of a tenant namespace 102B. The method 500 will be described based on one more previously described implementations, including previously described figures; however, it is understood that these are merely for illustrative purposes and the method 500 can be performed in relation to other implementations. Further, although the operations of the method 500 are shown as being performed sequentially, in some implementations, two or more operations may be performed in partially or entirely overlapping time periods.

As shown in FIG. 5, the method 500 can commence at operation 502 with an administrator namespace 102A receiving a custom resource definition 114. The custom resource definition 114 can define a schema for global objects 112 in a cluster 100. For example, the custom resource definition 114 can reference a first set of fields. In particular, the custom resource definition 114 received at operation 502 indicates a set of fields that are permitted in a corresponding global object 112 (e.g., the first set of fields), including one or more fields from the set of fields that are required in a corresponding global object 112. For example, in the example custom resource definition 114 shown in FIG. 3, the first set of fields may be the fields 304A-304E, where the fields 304A and 304B are required fields 306 in a corresponding global object 112 while the fields 304C, 304D, and 304E are optional in any global object 112 that is created based on this example custom resource definition 114. In one implementation, the custom resource definition 114 is generated by an administrator of the cluster 100 and/or the administrator namespace 102A and is received from the administrator at operation 502.

At operation 504, the administrator namespace 102A receives a global object 112. The global object 112 may be generated based on the custom resource definition 114 and includes a second set of fields. In particular, the second set of fields is based on the first set of fields from the custom resource definition 114. For instance, the second set of fields may have a number of fields equal to or less than the number of fields in the first set of fields, and each field in the second set of fields has a counterpart in the first set of fields (e.g., has a same name or other identifier). For example, using the custom resource definition 114 from FIG. 3 with the fields 304A-304E, the global object 114 shown in FIG. 4 with the set of fields 406A-406E is correctly generated, as fields 406A-406E (e.g., the second set of fields) respectively match with or otherwise correspond to the fields 304A-304E (e.g., the first set of fields). In some implementations, the second set of fields at least indicate a parent resource 104, which will be replicated, and a set of tenant namespaces 102B, to which the identified parent resource 104 will be replicated to. In particular, the identified parent resource 104, which resides in an administrator namespace 102A, will be replicated into one or more tenant namespaces 102B and these replications can be referred to as child resources 106.

Figure 6:
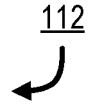
FIG. 6 shows a global object that was generated based on the custom resource definition after a change has been made to the global object, according to one example implementation.
Figure 7:
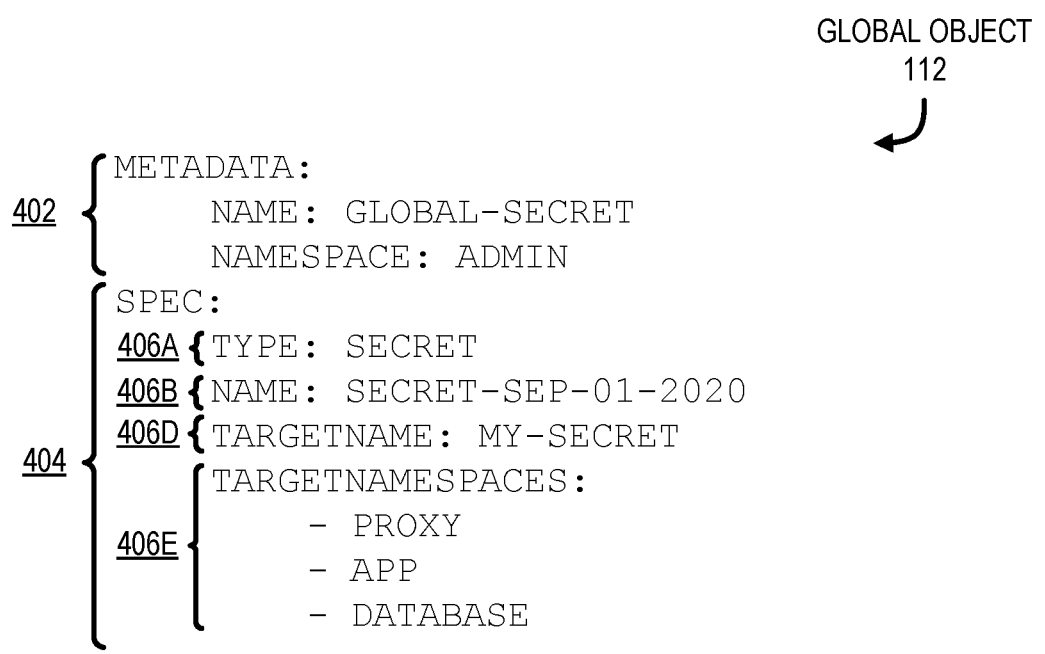
FIG. 7 shows a global object that was generated based on the custom resource definition after a change has been made to the global object, according to one example implementation.

At operation 506, the operator controller 108 monitors the global object 112. In particular, the operator controller 108 monitors the global object 112 for changes to the global object 112. For example, the operator controller 108 can monitor the global object 112 to determine if there are any (1) additions of fields 406, (2) changes to values of fields 406, and/or (3) deletion of fields 406 within the global object 112. For example, the controller operator 108 may be monitoring the global object 112 shown in FIG. 4. In one case, the global object 112 may be altered to change a value of the name field 406B from "SECRET-SEP-01-2020" to "SECRET-OCT-01-2020" as shown in FIG. 6. In another case, the global object 112 may be altered to remove the match labels field 406C as shown in FIG. 7. The operator controller 108 monitors the global object 112 to detect these changes. In some implementations, a change to the global object 112 can include the receipt or generation of the global object 112. For example, the operator controller 108 can monitor the administrator namespace 102A to determine that the global object 112 has been created/received and this represents a change.

At operation 508, the operator controller 108 determines if a change has been made to the global object 112. For example, as noted above, the operator controller 108 determines if there are any (1) additions of fields 406 to the global object 112, (2) changes to values of fields 406 within the global object 112, (3) deletion of fields 406 within the global object 112, and/or (4) creation or receipt of the global object 112. In response to detecting/determining that a change has occurred to the global object 112, the method 500 moves to operation 510.

Figure 9:
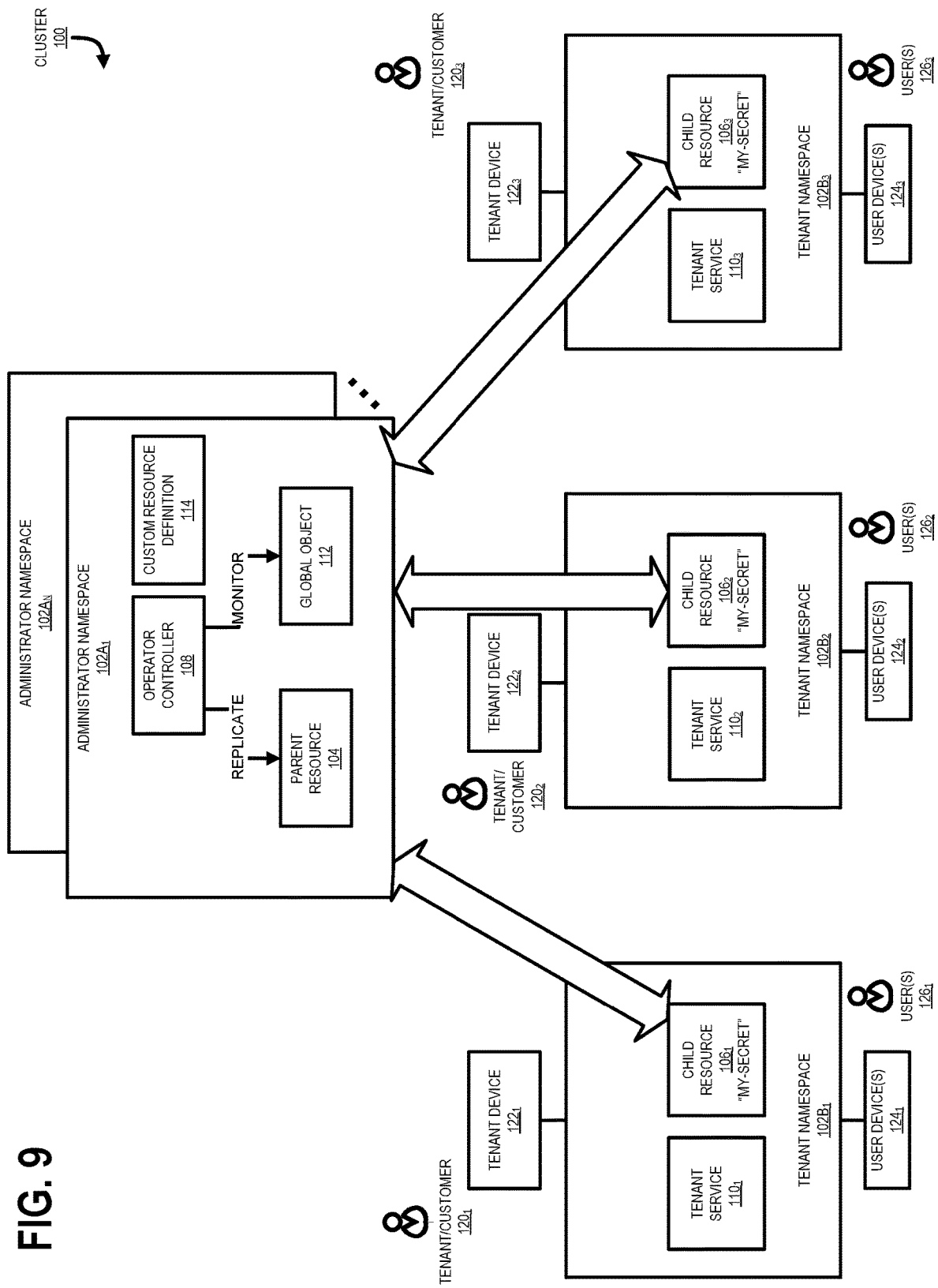
FIG. 9 shows the parent resource replicated in each tenant namespace of the cluster that was indicated in the global object, according to one example implementation.

At operation 510, the operator controller 108 replicates one or more parent resources 104 identified by the global object 112. For example, FIG. 8 shows a parent resource 104 according to one example implementation. The parent resource 104 of FIG. 8 may be used to store a secret used for authentication. In particular, the parent resource 104 includes a metadata section 802, which includes a name field 804A and a namespace field 804B. The name field 804A indicates that the parent resource 104 has a name of "SECRET-SEP-01-2020" (e.g., the name of a file or object representing this parent resource 104 is "SECRET-SEP-01-2020") and namespace field 804B indicates that the parent resource 104 is located in the "ADMIN" namespace 102 (e.g., the administrator namespace $102A_1$). As can be seen, the parent resource 104 of FIG. 8 has a name that corresponds to the parent resource 104 identified in the global object 112 of FIG. 4. Accordingly, the parent resource 104 can be replicated by the operator controller 108 according to the global object 112 of FIG. 4 at operation 510. In particular, the parent resource 104 of FIG. 8 is replicated in each tenant namespace 102B identified by the global object 112 of FIG. 4. As shown in FIG. 4, the identified tenant namespaces 102B include tenant namespaces 102B that are associated with a namespace key with a value of "MONITORING" (corresponding to the match labels field 406C) and the tenant namespaces 102B with the names "PROXY", "APP", and "DATABASE" (corresponding to the target namespaces field 406E). For purposes of illustration, the set of tenant namespaces 102A identified by the global object 112 of FIG. 4, including based on the match labels field 406C and the target namespaces field 406E, are the tenant namespaces $102B_1$-$102B_3$. Accordingly, the parent resource 104 of FIG. 8 is replicated into each of the tenant namespaces $102B_1$-$102B_3$. These replicated parent resources 104 can be represented in the tenant namespaces $102B_1$-$102B_3$ by the child resources $106_1$-$106_3$, respectively. Further, these child resources $106_1$-$106_3$ can be named according to a value of the target name field 406D of the global object 112. In particular, each of the child resources $106_1$-$106_3$ can be named "MY-SECRET" as shown in FIG. 9. In some implementation, when one or more of the tenant namespaces $102B_1$-$102B_3$ already includes a child resource 106 (e.g., a file or object) with the name "MY-SECRET", the operator controller 108 may delete this resource 106 and replace it with a replica of the parent resource 104 indicated in the global object 112.

Following operation 510 or in response to detecting/determining at operation 508 that no changes have occurred to the global object 112, the method 500 moves to operation 512. At operation 512, the operator controller 108 monitors each of the child resources 106 in the tenant namespaces 102B. For example, the operator controller 108 can monitor each of the child resources 106 in the tenant namespaces 102B to determine if there are any (1) additions of fields, (2) changes to values of fields, and/or (3) deletion of fields within each of the child resources 106 in the tenant namespaces 102B. For example, if one of the child resources 106 has been altered to reflect a change to a key value for a field relative to the parent resource 104, the operator controller 108 detects this change. Alternatively, if a child resource 106 has been renamed or deleted from a tenant namespace 102B, the operator controller 108 detects this change. These changes may have been triggered or otherwise caused by a user 126, user device 124, and/or a service in the tenant namespace 102B.

At operation 514, if the operator controller 108 does not detect a change to a child resource 106, the method 500 returns to operation 506 to continue to monitor the global object 112. Conversely, if the operator controller 108 detects a change to a child resource 106, the method 500 moves to operation 516.

At operation 516, the operator controller 108 replaces any child resource 106 for which a change has been detected. In particular, if a change has been detected to a child resource 106, the controller operator 108 may again replicate the parent resource 104 to the corresponding tenant namespaces 102B. This replication may cause the previous version of the child resource 106 to be deleted/overwritten. Following operation 516, the method 500 can return to operation 506 to continue monitoring the global object 112 for changes.

As described above, the system and techniques described herein provide an abstracted global view of objects/resources that are scoped at the namespace layer. Thus, certain objects can be shared in a modular and cloud agnostic fashion. In particular, parent resources 104 (e.g., secret keys and/or configuration maps) can be shared or otherwise be made available by an administrator namespace 102A (i.e., a higher level namespace 102) to a services 110 of a set of tenant namespaces 102B (i.e., lower level namespaces 102) without the need to manually replicating these objects based on changes or updates. Accordingly, resources can be saved, including limiting involvement of administrators, and errors caused by administrator involvement can be minimized.

One or more parts of the above implementations may include software and/or a combination of software and hardware. An electronic device (also referred to as a computing device, computer, etc.) includes hardware and software, such as a set of one or more processors coupled to one or more machine-readable storage media (e.g., magnetic disks, optical disks, read only memory (ROM), Flash memory, phase change memory, solid state drives (SSDs)) to store code (which is composed of software instructions and which is sometimes referred to as computer program code or a computer program) for execution on the set of processors and/or to store data. For instance, an electronic device may include non-volatile memory (with slower read/write times, e.g., magnetic disks, optical disks, read only memory (ROM), Flash memory, phase change memory, SSDs) and volatile memory (e.g., dynamic random access memory (DRAM), static random access memory (SRAM)), where the non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device is turned off, and that has sufficiently fast read/write times such that, rather than copying the part of the code/data to be executed into volatile memory, the code/data may be provided directly to the set of processors (e.g., loaded into a cache of the set of processors); in other words, this non-volatile memory operates as both long term storage and main memory, and thus the electronic device may have no or only a small amount of volatile memory for main memory. In addition to storing code and/or data on machine-readable storage media, typical electronic devices can transmit code and/or data over one or more machine-readable transmission media (also called a carrier) (e.g., electrical, optical, radio, acoustical or other form of propagated signals—such as carrier waves, infrared signals). For instance, typical electronic devices also include a set of one or more physical network interface(s) to establish network connections (to transmit and/or receive code and/or data using propagating signals) with other electronic devices. Thus, an electronic device may store and transmit (internally and/or with other electronic devices over a network) code and/or data with one or more machine-readable media (also referred to as computer-readable media).

Electronic devices are used for a variety of purposes. For example, an electronic device (sometimes referred to as a server electronic device) may execute code that cause it to operate as one or more servers used to provide a service to another electronic device(s) (sometimes referred to as a client electronic device, a client computing device, or a client device) that executes client software (sometimes referred to as client code or an end user client) to communicate with the service. The server and client electronic devices may be operated by users respectively in the roles of administrator (also known as an administrative user) and end user.

Figure 10A:
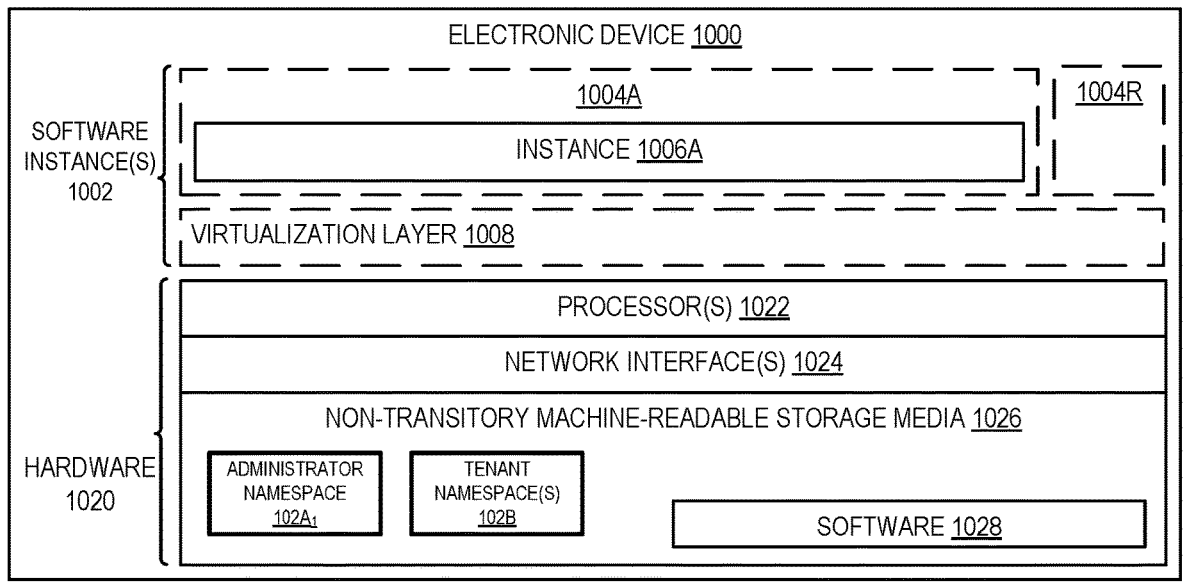
FIG. 10A is a block diagram illustrating an electronic device according to some example implementations.

FIG. 10A is a block diagram illustrating an electronic device 1000 according to some example implementations. FIG. 10A includes hardware 1020 comprising a set of one or more processor(s) 1022, a set of one or more network interfaces 1024 (wireless and/or wired), and non-transitory machine-readable storage media 1026 having stored therein software 1028 (which includes instructions executable by the set of one or more processor(s) 1022). Each of the previously described end user clients, namespaces, and/or the operator controller may be implemented in one or more electronic devices 1000. In one implementation: 1) each of the end user clients is implemented in a separate one of the electronic devices 1000 (e.g., in user electronic devices operated by users where the software 1028 represents the software to implement end user clients to interface with the operator controller (e.g., a web browser, a native client, a portal, a command-line interface, and/or an application program interface (API) based upon protocols such as Simple Object Access Protocol (SOAP), Representational State Transfer (REST), etc.)); 2) the operator controller is implemented in a separate set of one or more of the electronic devices 1000 (e.g., a set of one or more server electronic devices where the software 1028 represents the software to implement the operator controller); and 3) in operation, the electronic devices implementing the end user clients, namespaces, and/or the operator controller would be communicatively coupled (e.g., by a network) and would establish between them (or through one or more other layers) connections for providing access to the operator controller. Other configurations of electronic devices may be used in other implementations (e.g., an implementation in which the end user client and the operator controller are implemented on a single electronic device 1000).

In electronic devices that use compute virtualization, the set of one or more processor(s) 1022 typically execute software to instantiate a virtualization layer 1008 and software container(s) 1004A-R (e.g., with operating system-level virtualization, the virtualization layer 1008 represents the kernel of an operating system (or a shim executing on a base operating system) that allows for the creation of multiple software containers 1004A-R (representing separate user space instances and also called virtualization engines, virtual private servers, or jails) that may each be used to execute a set of one or more applications; with full virtualization, the virtualization layer 1008 represents a hypervisor (sometimes referred to as a virtual machine monitor (VMM)) or a hypervisor executing on top of a host operating system, and the software containers 1004A-R each represent a tightly isolated form of a software container called a virtual machine that is run by the hypervisor and may include a guest operating system; with para-virtualization, an operating system or application running with a virtual machine may be aware of the presence of virtualization for optimization purposes). Again, in electronic devices where compute virtualization is used, during operation an instance of the software 1028 (illustrated as instance 1006A) is executed within the software container 1004A on the virtualization layer 1008. In electronic devices where compute virtualization is not used, the instance 1006A on top of a host operating system is executed on the "bare metal" electronic device 1000. The instantiation of the instance 1006A, as well as the virtualization layer 1008 and software containers 1004A-R if implemented, are collectively referred to as software instance(s) 1002.

Alternative implementations of an electronic device may have numerous variations from that described above. For example, customized hardware and/or accelerators might also be used in an electronic device.

A network device (ND) is an electronic device that communicatively interconnects other electronic devices on the network (e.g., other network devices, user electronic devices, server electronic devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

Figure 10B:
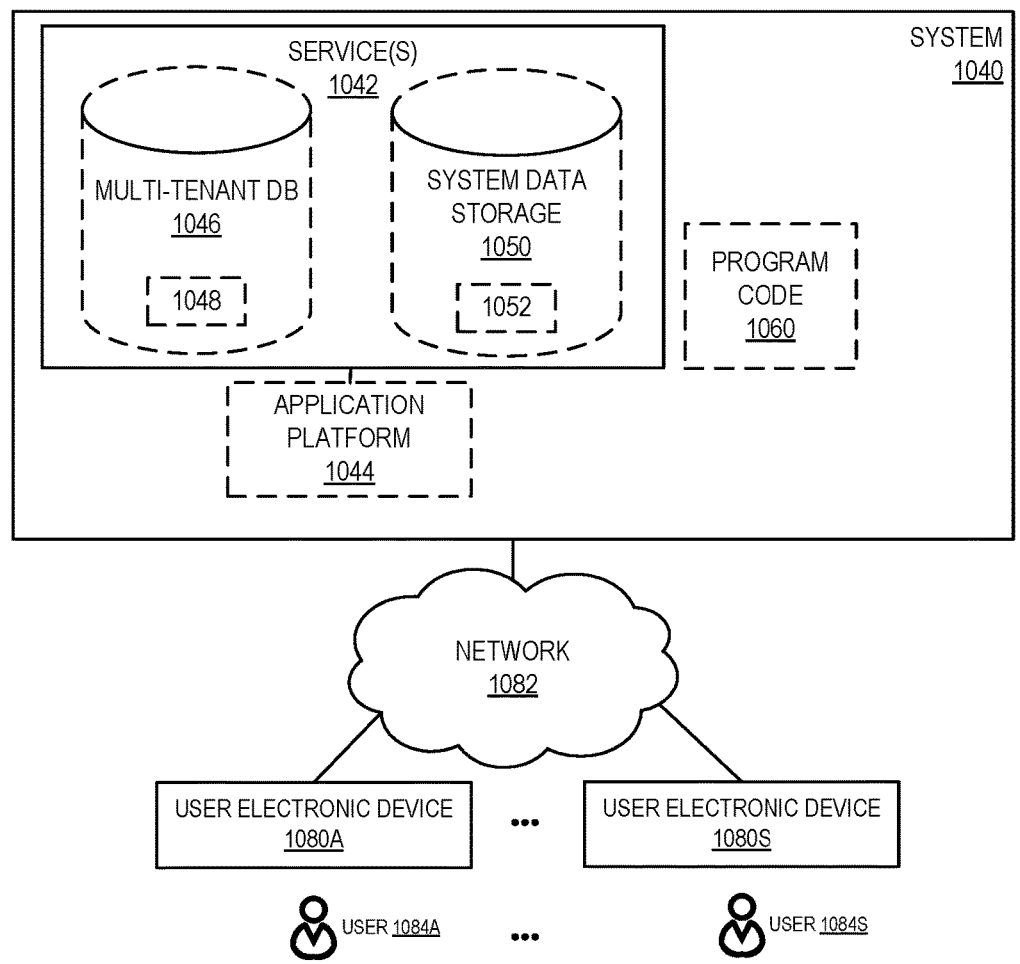
FIG. 10B is a block diagram of an environment where a cluster, including one or more namespaces, an operator controller, a set of parent resources, and a set of child resources may be deployed, according to some implementations.

FIG. 10B is a block diagram of an environment where a set of namespaces, including an operator controller, services, parent resources, and/or child resources may be deployed, according to some implementations. A system 1040 includes hardware (a set of one or more electronic devices) and software to provide service(s) 1042, including the operator controller. The system 1040 is coupled to user electronic devices 1080A-S over a network 1082. The service(s) 1042 may be on-demand services that are made available to one or more of the users 1084A-S working for one or more other organizations (sometimes referred to as outside users) so that those organizations do not need to necessarily be concerned with building and/or maintaining a system, but instead makes use of the service(s) 1042 when needed (e.g., on the demand of the users 1084A-S). The service(s) 1042 may communicate with each other and/or with one or more of the user electronic devices 1080A-S via one or more Application Programming Interface(s) (APIs) (e.g., a Representational State Transfer (REST) API). The user electronic devices 1080A-S are operated by users 1084A-S.

In one implementation, the system 1040 is a multi-tenant cloud computing architecture supporting multiple services, such as a customer relationship management (CRM) service (e.g., Sales Cloud by salesforce.com, Inc.), a contracts/proposals/quotes service (e.g., Salesforce CPQ by salesforce.com, Inc.), a customer support service (e.g., Service Cloud and Field Service Lightning by salesforce.com, Inc.), a marketing service (e.g., Marketing Cloud, Salesforce DMP, and Pardot by salesforce.com, Inc.), a commerce service (e.g., Commerce Cloud Digital, Commerce Cloud Order Management, and Commerce Cloud Store by salesforce.com, Inc.), communication with external business data sources (e.g., Salesforce Connect by salesforce.com, Inc.), a productivity service (e.g., Quip by salesforce.com, Inc.), database as a service (e.g., Database.com™ by salesforce.com, Inc.), Data as a Service (DAAS) (e.g., Data.com by salesforce.com, Inc.), Platform as a Service (PAAS) (e.g., execution runtime and application (app) development tools; such as, Heroku™ Enterprise, Thunder, and Force.com® and Lightning by salesforce.com, Inc.), an analytics service (e.g., Einstein Analytics, Sales Analytics, and/or Service Analytics by salesforce.com, Inc.), a community service (e.g., Community Cloud and Chatter by salesforce.com, Inc.), an Internet of Things (IoT) service (e.g., Salesforce IoT and IoT Cloud by salesforce.com, Inc.), industry specific services (e.g., Financial Services Cloud and Health Cloud by salesforce.com, Inc.), and/or Infrastructure as a Service (IAAS) (e.g., virtual machines, servers, and/or storage). For example, system 1040 may include an application platform 1044 that enables PAAS for creating, managing, and executing one or more applications developed by the provider of the application platform 1044, users accessing the system 1040 via one or more of user electronic devices 1080A-S, or third-party application developers accessing the system 1040 via one or more of user electronic devices 1080A-S.

In some implementations, one or more of the service(s) 1042 may utilize one or more multi-tenant databases 1046 for tenant data 1048, as well as system data storage 1050 for system data 1052 accessible to system 1040. In certain implementations, the system 1040 includes a set of one or more servers that are running on server electronic devices and that are configured to handle requests for any authorized user associated with any tenant (there is no server affinity for a user and/or tenant to a specific server). The user electronic device 1080A-S communicate with the server(s) of system 1040 to request and update tenant-level data and system-level data hosted by system 1040, and in response the system 1040 (e.g., one or more servers in system 1040) automatically may generate one or more Structured Query Language (SQL) statements (e.g., one or more SQL queries) that are designed to access the desired information from the one or more multi-tenant database 1046 and/or system data storage 1050.

In some implementations, the service(s) 1042 are implemented using virtual applications dynamically created at run time responsive to queries from the user electronic devices 1080A-S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 1060 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 1044 includes an application setup mechanism that supports application developers' creation and management of applications, which may be saved as metadata by save routines. Invocations to such applications, including the operator controller, may be coded using Procedural Language/Structured Object Query Language (PL/SOQL) that provides a programming language style interface. A detailed description of some PL/SOQL language implementations is discussed in U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007. Invocations to applications may be detected by one or more system processes, which manages retrieving application metadata for the tenant making the invocation and executing the metadata as an application in a software container (e.g., a virtual machine).

Network 1082 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, or similar wired and/or wireless protocols, and may include one or more intermediary devices for routing data between the system 1040 and the user electronic devices 1080A-S.

Each user electronic device 1080A-S (such as a desktop personal computer, workstation, laptop, Personal Digital Assistant (PDA), smart phone, etc.) typically includes one or more user interface devices, such as a keyboard, a mouse, a trackball, a touch pad, a touch screen, a pen or the like, for interacting with a graphical user interface (GUI) provided on a display (e.g., a monitor screen, a liquid crystal display (LCD), etc.) in conjunction with pages, forms, applications and other information provided by system 1040. For example, the user interface device can be used to access data and applications hosted by system 1040, and to perform searches on stored data, and otherwise allow a user 1084 to interact with various GUI pages that may be presented to a user 1084. User electronic devices 1080A-S might communicate with system 1040 using TCP/IP (Transfer Control Protocol and Internet Protocol) and, at a higher network level, use other networking protocols to communicate, such as Hypertext Transfer Protocol (HTTP), FTP, Andrew File System (AFS), Wireless Application Protocol (WAP), File Transfer Protocol (FTP), Network File System (NFS), an application program interface (API) based upon protocols such as Simple Object Access Protocol (SOAP), Representational State Transfer (REST), etc. In an example where HTTP is used, one or more user electronic devices 1080A-S might include an HTTP client, commonly referred to as a "browser," for sending and receiving HTTP messages to and from server(s) of system 1040, thus allowing users 1084 of the user electronic device 1080A-S to access, process and view information, pages and applications available to it from system 1040 over network 1082.

In the above description, numerous specific details such as resource partitioning/sharing/duplication implementations, types and interrelationships of system components, and logic partitioning/integration choices are set forth in order to provide a more thorough understanding. It will be appreciated, however, by one skilled in the art, that the invention may be practiced without such specific details. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

In the following description and claims, the term "coupled," along with its derivatives, may be used. "Coupled" is used to indicate that two or more elements, which may or may not be in direct physical or electrical contact with each other, co-operate or interact with each other.

The operations in the flow diagrams are described with reference to the exemplary implementations in the other figures. However, the operations of the flow diagrams can be performed by implementations other than those discussed with reference to the other figures, and the implementations discussed with reference to these other figures can perform operations different than those discussed with reference to the flow diagrams.

While the flow diagrams in the figures show a particular order of operations performed by certain implementations, it should be understood that such order is exemplary (e.g., alternative implementations may perform the operations in a different order, combine certain operations, overlap certain operations, etc.).

While the above description includes several exemplary implementations, those skilled in the art will recognize that the invention is not limited to the implementations described and can be practiced with modification and alteration within the spirit and scope of the appended claims. The description is thus illustrative instead of limiting.

What is claimed is:

1. A method for replicating a set of parent resources from an administrator namespace to a set of namespaces for customers, the method comprising:
   receiving, by the administrator namespace, a global object that includes a set of object fields that reference (1) a set of parent resources and (2) the set of namespaces for customers;
   monitoring, by an operator controller of the administrator namespace, the global object to determine whether a change has been made to the global object; and
   replicating, by the operator controller, the set of parent resources to the set of namespaces for customers as child resources based on the global object in response to detecting a change to the global object.

2. The method of claim 1, further comprising:
   receiving, by the administrator namespace, a custom resource definition that describes a schema for the global object,
   wherein the operator controller verifies that the global object complies with the schema of the custom resource definition before monitoring the global object.

3. The method of claim 2, wherein the schema of the custom resource definition indicates a set of fields that are permitted to be in the global object and a set of fields that are required to be in the global object, and
   wherein the set of object fields are to include the set of fields that are required to be in the global object and the set of object fields are to be selected from the set of fields that are permitted to be in the global object.

4. The method of claim 1, further comprising:
   monitoring, by the operator controller, the child resources in the set of namespaces for customers to detect changes between each of the child resources and each respective parent resource in the set of parent resources; and
   in response to detecting a change to a child resource in a namespace for a customer, replicating, by the operator controller, a respective parent resource to the namespace for the customer to replace the child resource for which the change was detected.

5. The method of claim 1, wherein the change to the global object includes one or more of (1) additions of object fields to the global object, (2) changes to values for the set of object fields within the global object, (3) deletion of object fields within the global object, and (4) creation or receipt of the global object.

6. The method of claim 1, wherein each of the namespaces for customers in the set of namespaces for customers does not have permission to access resources from the administrator namespace or other namespaces for customers in the set of namespaces for customers; and
wherein the administrator namespace has permission to access resources in each of the namespaces for customers in the set of namespaces for customers.

7. A non-transitory machine-readable storage medium that provides instructions that, when executed by a processor, will cause said processor to perform operations comprising:
receiving a global object that includes a set of object fields that reference (1) a set of parent resources and (2) a set of namespaces for customers;
monitoring the global object to determine whether a change has been made to the global object; and
replicating the set of parent resources from an administrator namespace to the set of namespaces for customers as child resources based on the global object in response to detecting a change to the global object.

8. The non-transitory machine-readable storage medium of claim 7, wherein the operations further include:
receiving a custom resource definition that describes a schema for the global object; and
verifying that the global object complies with the schema of the custom resource definition before monitoring the global object.

9. The non-transitory machine-readable storage medium of claim 8, wherein the schema of the custom resource definition indicates a set of fields that are permitted to be in the global object and a set of fields that are required to be in the global object, and
wherein the set of object fields are to include the set of fields that are required to be in the global object and the set of object fields are to be selected from the set of fields that are permitted to be in the global object.

10. The non-transitory machine-readable storage medium of claim 7, wherein the operations further include:
monitoring the child resources in the set of namespaces for customers to detect changes between each of the child resources and each respective parent resource in the set of parent resources; and
in response to detecting a change to a child resource in a namespace for a customer, replicating a respective parent resource to the namespace for the customer to replace the child resource for which the change was detected.

11. The non-transitory machine-readable storage medium of claim 8, wherein the change to the global object includes one or more of (1) additions of object fields to the global object, (2) changes to values for the set of object fields within the global object, (3) deletion of object fields within the global object, and (4) creation or receipt of the global object.

12. The non-transitory machine-readable storage medium of claim 8, wherein each of the namespaces for customers in the set of namespaces for customers does not have permission to access resources from the administrator namespace or other namespaces for customers in the set of namespaces for customers; and
wherein the administrator namespace has permission to access resources in each of the namespaces for customers in the set of namespaces for customers.

13. A device for replicating a set of parent resources from an administrator namespace to a set of namespaces for customers, the device comprising:
a processor; and
a set of memory units, wherein the set of memory units include instructions that, when performed by the processor, cause the processor to:
receive a global object that includes a set of object fields that reference (1) a set of parent resources and (2) the set of namespaces for customers;
monitor the global object to determine whether a change has been made to the global object; and
replicate the set of parent resources to the set of namespaces for customers as child resources based on the global object in response to detecting a change to the global object.

14. The device of claim 13, wherein the instructions further cause the processor to:
receive a custom resource definition that describes a schema for the global object, and
verify that the global object complies with the schema of the custom resource definition before monitoring the global object.

15. The device of claim 14, wherein the schema of the custom resource definition indicates a set of fields that are permitted to be in the global object and a set of fields that are required to be in the global object, and
wherein the set of object fields are to include the set of fields that are required to be in the global object and the set of object fields are to be selected from the set of fields that are permitted to be in the global object.

16. The device of claim 13, wherein the instructions further cause the processor to:
monitor the child resources in the set of namespaces for customers to detect changes between each of the child resources and each respective parent resource in the set of parent resources; and
in response to detecting a change to a child resource in a namespace for a customer, replicate a respective parent resource to the namespace for the customer to replace the child resource for which the change was detected.

17. The device of claim 13, wherein the change to the global object includes one or more of (1) additions of object fields to the global object, (2) changes to values for the set of object fields within the global object, (3) deletion of object fields within the global object, and (4) creation or receipt of the global object.

18. The device of claim 13, wherein each of the namespaces for customers in the set of namespaces for customers does not have permission to access resources from the administrator namespace or other namespaces for customers in the set of namespaces for customers; and
wherein the administrator namespace has permission to access resources in each of the namespaces for customers in the set of namespaces for customers.

* * * * *